(12) United States Patent
Samuelson et al.

(10) Patent No.: US 7,001,996 B1
(45) Date of Patent: *Feb. 21, 2006

(54) ENZYMATIC TEMPLATE POLYMERIZATION

(75) Inventors: Lynne A. Samuelson, Marlborough, MA (US); Ferdinando Bruno, Andover, MA (US); Sukant K. Tripathy, deceased, late of Acton, MA (US); by Susan Tripathy, legal representative, Acton, MA (US); Ramaswamy Nagarajan, Lowell, MA (US); Jayant Kumar, Westford, MA (US); Wei Liu, Lowell, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/324,736

(22) Filed: Dec. 19, 2002

Related U.S. Application Data

(63) Continuation of application No. 09/447,987, filed on Nov. 23, 1999, now abandoned, which is a continuation-in-part of application No. 08/999,542, filed on Nov. 21, 1997, now Pat. No. 6,018,018, which is a continuation-in-part of application No. 08/915,827, filed on Aug. 22, 1997, now Pat. No. 5,994,498.

(51) Int. Cl.
*C12Q 1/68* (2006.01)
*C07H 21/02* (2006.01)

(52) U.S. Cl. .......................................... 536/23.1; 435/4
(58) Field of Classification Search ................... 435/4; 536/23.1

See application file for complete search history.

(56) References Cited

U.S. PATENT DOCUMENTS 6,018,018 A * 1/2000 Samuelson et al. ......... 528/422

* cited by examiner

*Primary Examiner*—Bradley L. Sisson
(74) *Attorney, Agent, or Firm*—Vincent J. Ranucci

(57) ABSTRACT

A conductive polymer is formed enzymatically in the presence of a polynucleotide template. The method includes combining at least one redox monomer with a polynucleotide template and a redox enzyme, such as horseradish peroxidase, to form a reaction mixture. The monomer aligns along the template before or during the polymerization. Therefore, the polynucleotide template thereby affects the molecular weight and conformation of the conductive polymer. When the conductive polymer is complexed to a polynucleotide duplex, the conformation of the polynucleotide duplex can be modulated by changing the oxidation state of the conductive polymer.

5 Claims, 13 Drawing Sheets

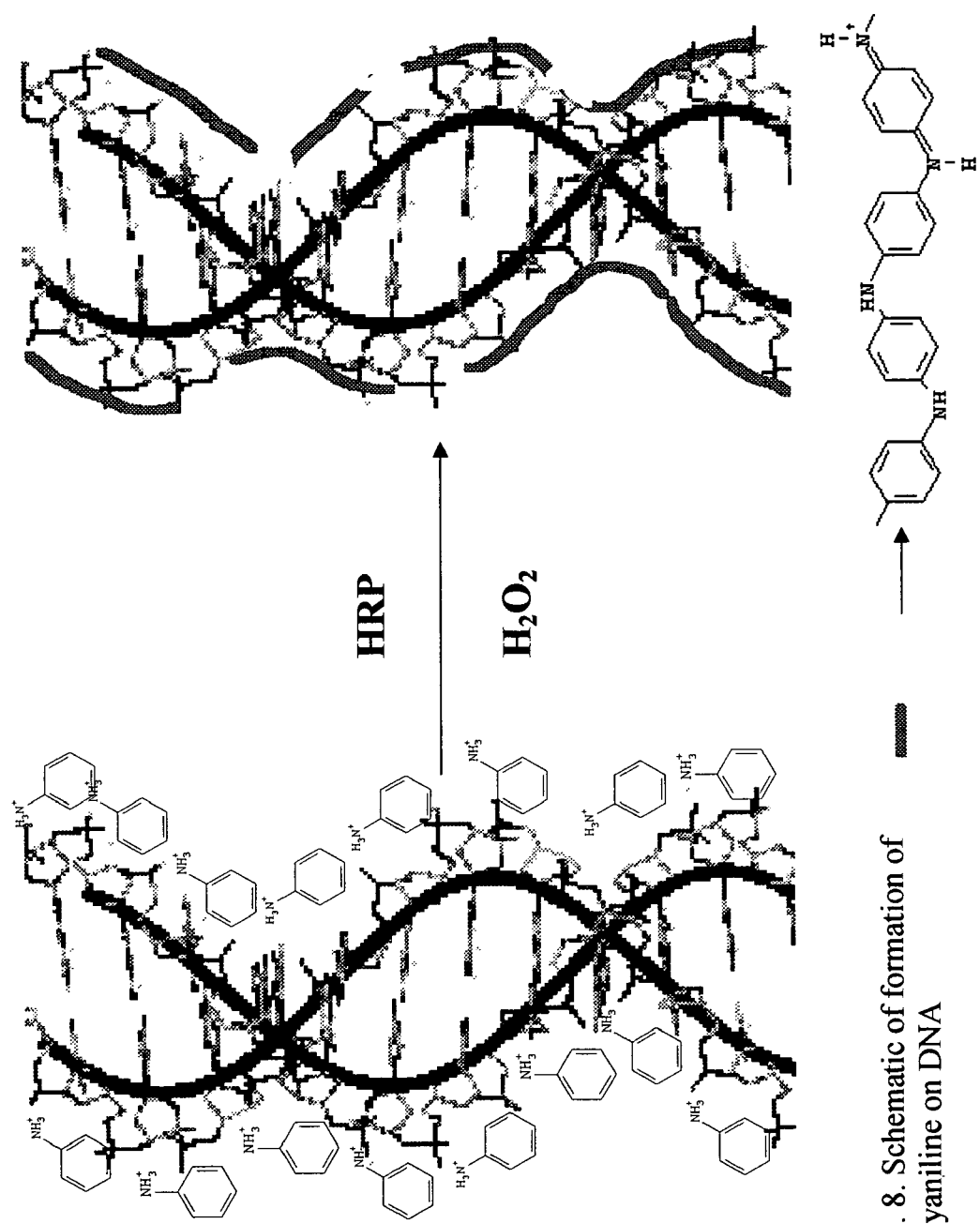
Fig. 8. Schematic of formation of Polyaniline on DNA

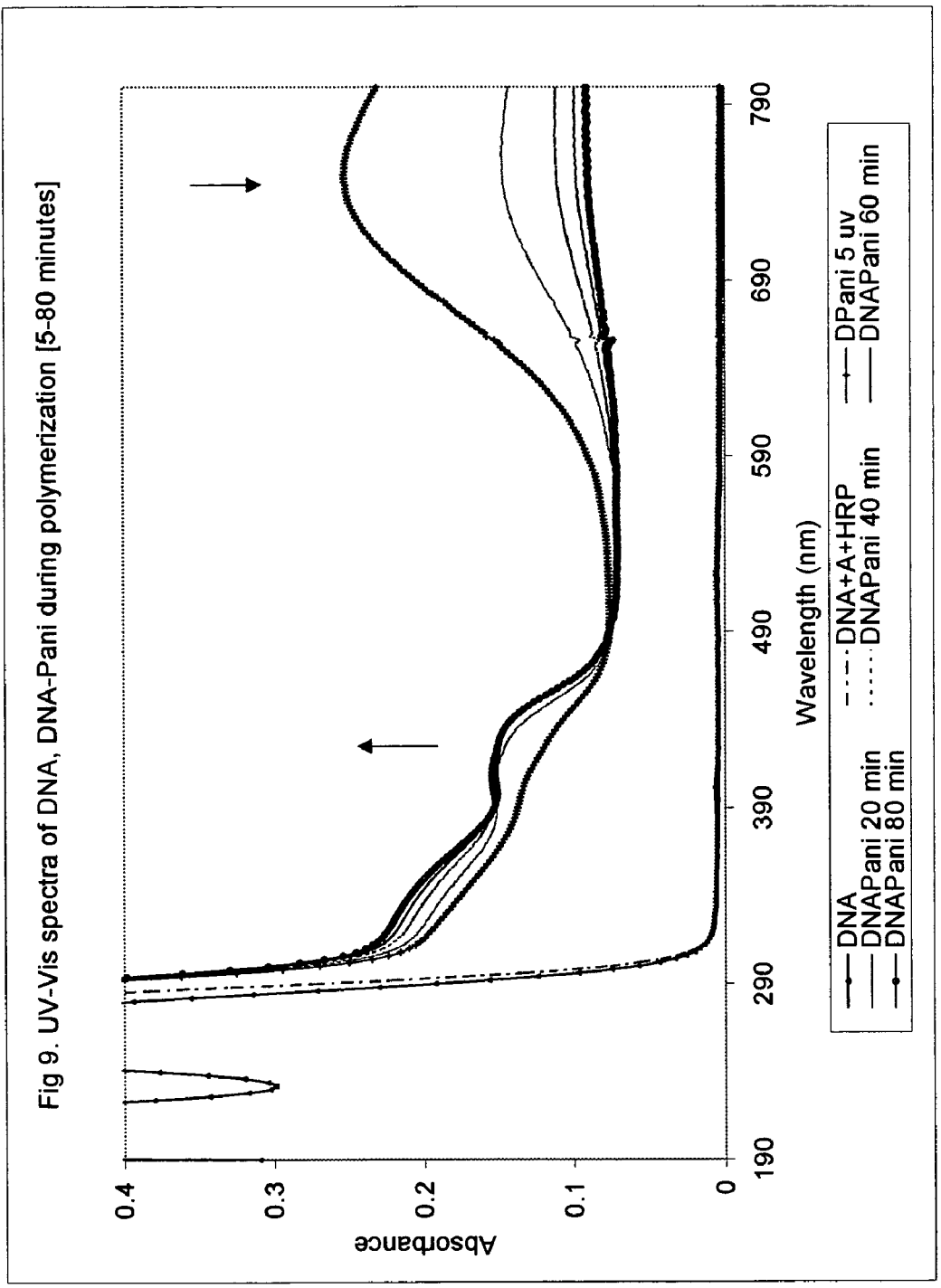

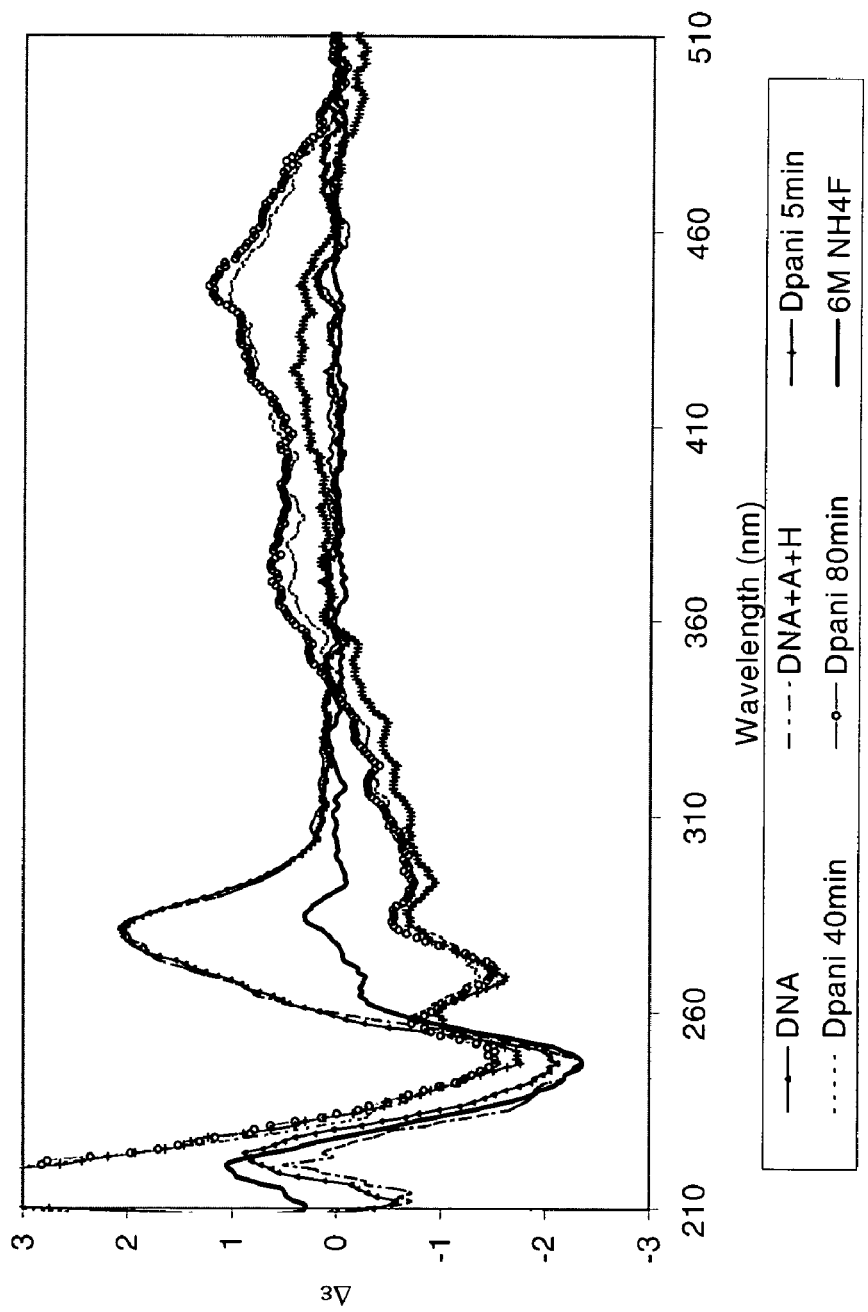

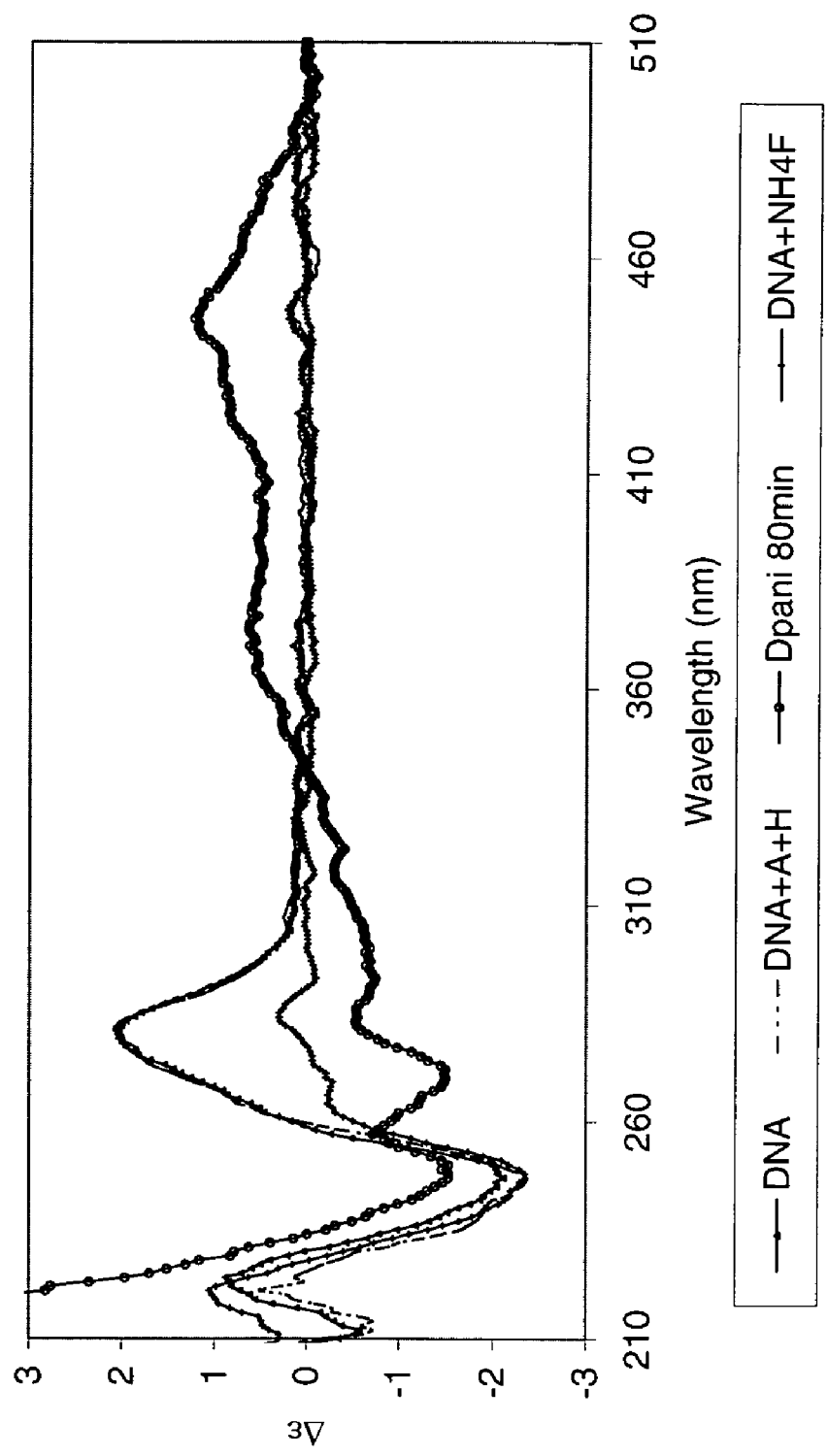

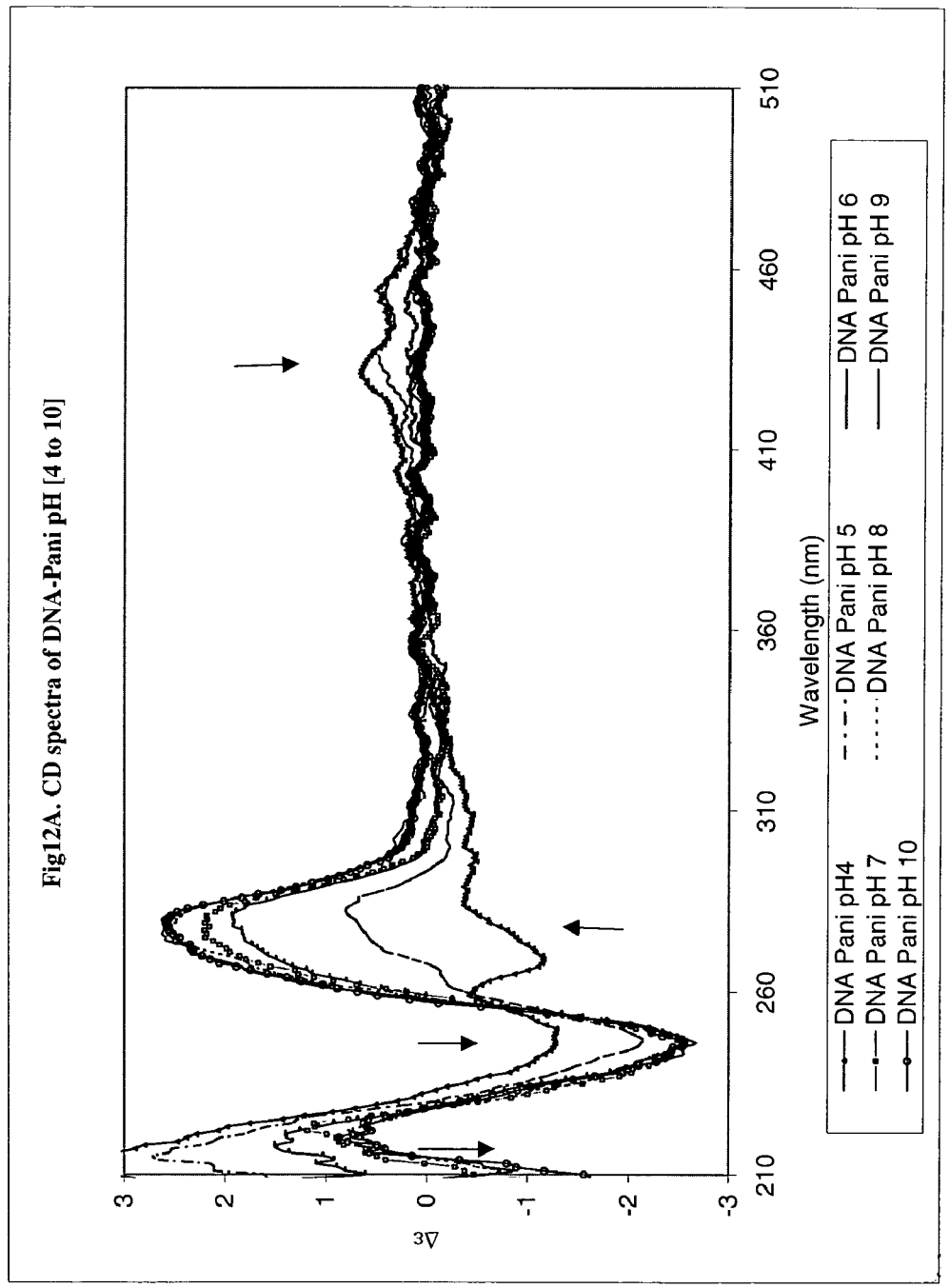

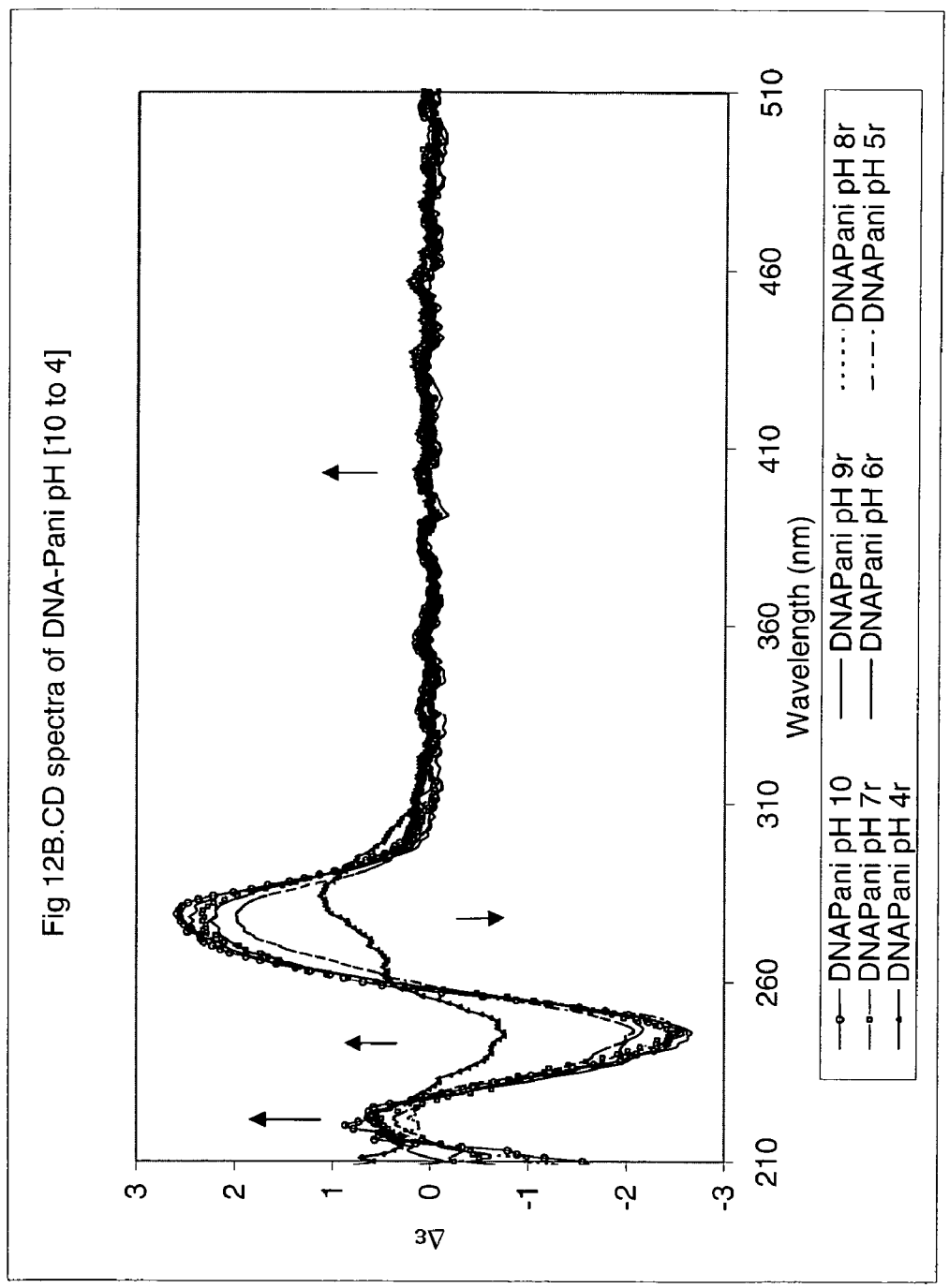

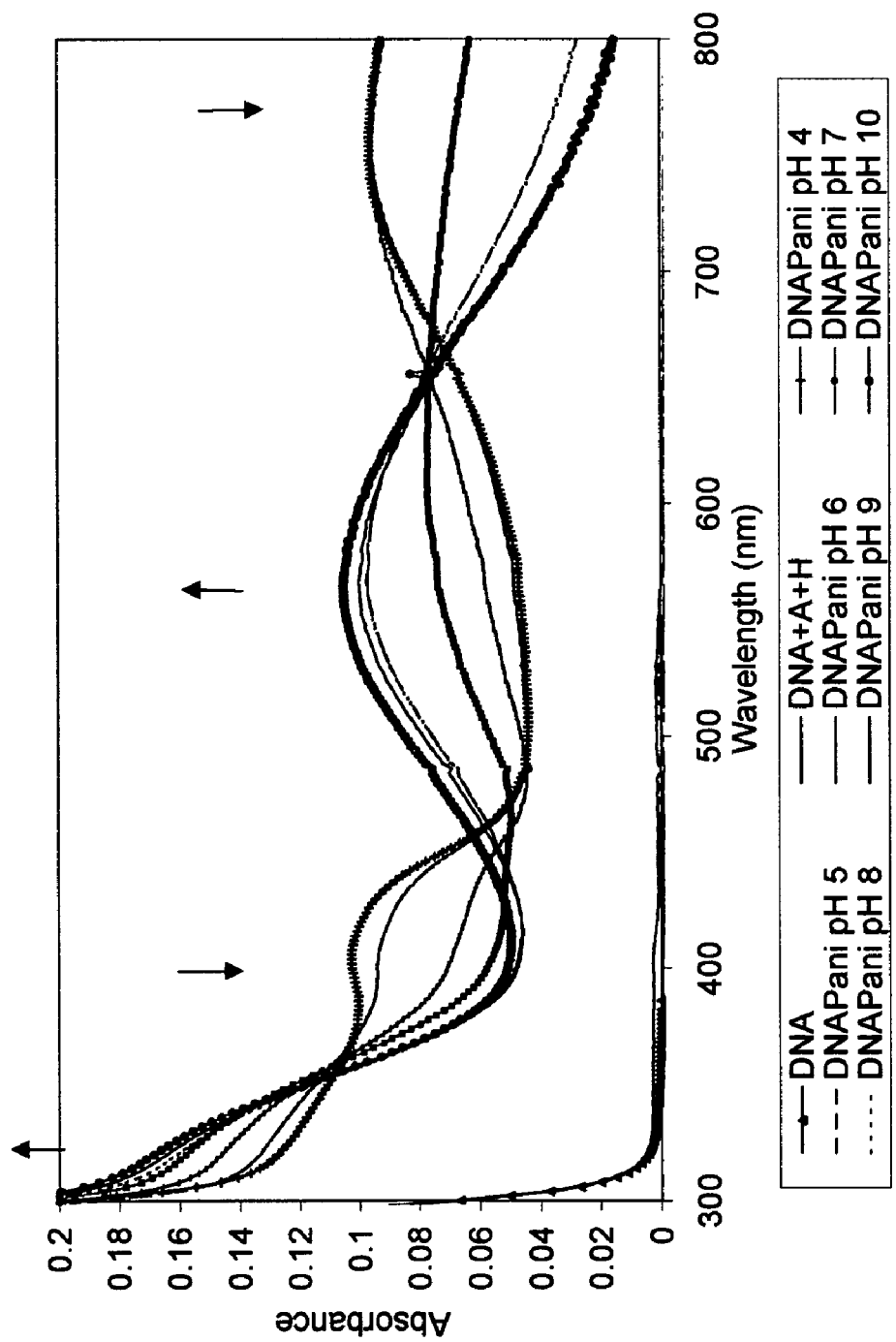

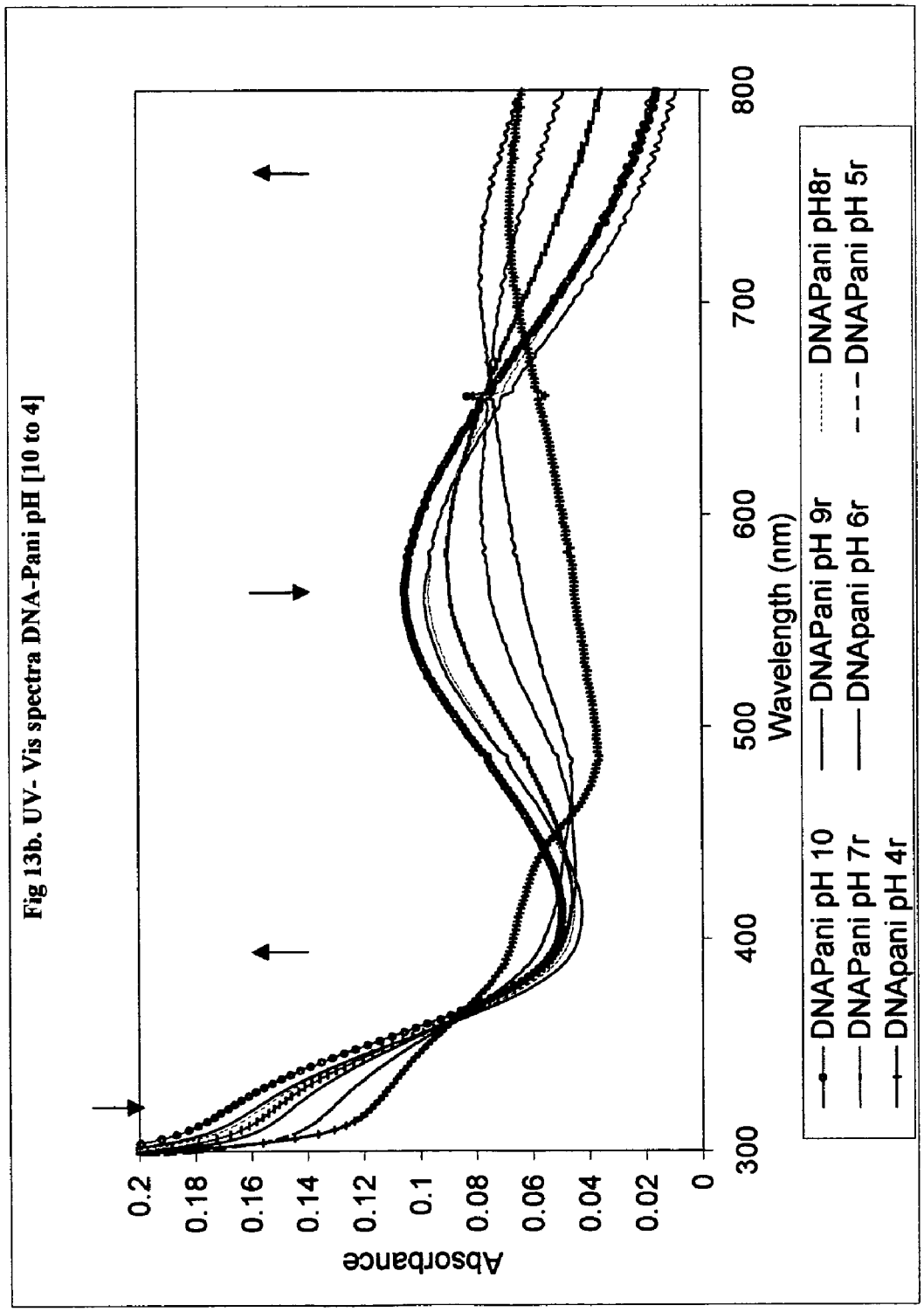

ENZYMATIC TEMPLATE POLYMERIZATION

RELATED APPLICATION

This is a continuation of U.S. application Ser. No. 09/447,987, filed Nov. 23, 1999 now abandoned, which is a continuation-in-part of U.S. application Ser. No. 08/999,542, filed Nov. 21, 1997 (now U.S. Pat. No. 6,018,018), which is a continuation-in-part of U.S. application Ser. No. 08/915,827, filed Aug. 21, 1997 (now U.S. Pat. No. 5,994,498), the entire teachings of which are incorporated herein by reference.

GOVERNMENT SUPPORT

This invention was made with support from the Government under ARO Cooperative Grant DAAH04-94-2-003. The Government has certain rights in this invention.

BACKGROUND OF THE INVENTION

Recently, there has been an increased interest in tailored development of certain classes of polymers, such as electrically conductive and optically active polymers (e.g. polythiophene, polypyrrole, polyphenols and polyaniline) for application to wider ranges of use. Examples of such uses include light-weight energy storage devices, electrolytic capacitors, anti-static and anti-corrosive coatings for smart windows, and biological sensors. However, the potential applications to which polymers can be put have been limited by their lack of solubility and processability.

In particular, interest in developing biosensors has been stimulated by efforts to sequence the human genome. Analysis and manipulation of polynucleotides is expected to have genetic engineering applications and aid in the diagnosis of genetic disease and in the development and improvement of new drugs. For example, deoxyribonucleotides (DNA) exist in living organisms almost exclusively in a double helix conformation. However, many variations in this conformation has been shown to exist (e.g., A-, B-, C- and Z-type duplexes). The helical structure of a particular duplex is related to its sequence and its environment. These variations in conformation are thought to be responsible for the binding of molecular species, such as enzymes or regulatory proteins, to DNA. Therefore, methods of modulating the conformation of DNA are expected to have applications in the area of biosensors, molecular recognition and drug development.

SUMMARY OF THE INVENTION

The present invention relates to a composition of matter in which a substituted or unsubstituted polyaniline is bound to a polynucleotide as a complex. The invention also relates to a method of preparing a polynucleotide/polyaniline complex, wherein the polynucleotide/polyaniline complex is formed by combining a substituted or unsubstituted aniline monomer, a polynucleotide template and a redox enzyme, whereby the aniline monomer aligns along the polynucleotide template to form a complex and polymerizes to form a polyaniline, thereby forming the polynucleotide/polyaniline complex.

Another aspect of the invention is a method of modulating the conformation of a polynucleotide double helix which is bound to a conductive polymer as a complex by changing the oxidation state of the conductive polymer. In a specific embodiment, polyaniline is bound to a polynucleotide double helix as a complex. Oxidation of polyaniline (e.g., increasing the positive charge on the polyaniline) which is complexed to a polynucleotide double helix causes the double helix to become more tightly wound (i.e., the double helix will have more base pairs per turn after oxidation of the polyaniline). Conversely, reducing the polyaniline will cause a double helix associated with it to become more loosely wound. Therefore, complexation of polyaniline to a polynucleotide double helix provides a method of modulating the conformation of the double helix by changing the oxidation state of the polyaniline.

The invention also relates to an electrical element that has a nanowire extending from it. The nanowire includes a polynucleotide template and a conductive polymer bound together as a complex.

Another aspect of the invention is a method of forming an electrically conductive connection between electrical elements. The method includes connecting at least two electrical elements with a polynucleotide and contacting the polynucleotide with an a redox monomer and a redox enzyme. The monomer aligns along the template to form a complex and polymerizes to form a conductive polymer that is complexed to the polynucleotide that connects the electrical elements. The polynucleotide/conductive polymer complex is electrically conductive and, therefore, forms an electrically conductive connection between the electrical elements.

Another embodiment of the invention is a method of identifying a target polynucleotide by contacting the target polynucleotide with a probe that includes a polynucleotide template complexed with a conductive polymer. The probe hybridizes with the target polynucleotide which causes at least one electromagnetic property of the conductive polymer to be modified. The target polynucleotide is identified by detecting the modified electromagnetic property.

In this invention, the polynucleotide can serve at least three critical functions. First, the polynucleotide can serve as a template upon which the monomers preferentially align themselves to form a complex, such as a charge-transfer complex, thereby limiting parasitic branching and controlling the shape of the polymer. In the case of polyaniline, the mechanism of polymerization is primarily para-directed and results in formation of the electrically active form of polyaniline. This preferential alignment provides improved electrical and optical properties of the final polymer complex. Second, the polynucleotide can serve as a large molecular dopant species which is complexed and essentially locked to the polyaniline chains. Current limitations to the actual use of polyaniline in electronic and optical applications largely has been due to poor dopant stability. Small ionic dopants or chromophores that are currently used are known to diffuse away with time and/or conditions. Locking of a large polyelectrolyte dopant (e.g., a polynucleotide) to the polymer is significant in that it ensures that the electronic nature of the conjugated backbone structure of the polymer is maintained, and hence the desired electronic and optical properties are stabilized. Third, the polynucleotide template can improve water solubility of the final polynucleotide/polyaniline complex for environmentally friendly, facile, and inexpensive processing.

In addition to the above advantages, complexation of a polynucleotide duplex, such as DNA, to an electrically conductive polymer provides a method by which the conformation of the duplex can be modulated, thereby providing possible application in the area of biosensors and drug development. For example, changing the oxidation state of polyaniline bound to a DNA duplex changes the linear length of a helical turn and, therefore, could be used to study the binding properties of DNA regulatory proteins.

BRIEF DESCRIPTION OF THE DRAWINGS

FIG. 8 is a schematic representation of polyaniline bound to a DNA double helix.

FIG. 9 shows the UV-Vis spectra of DNA and DNA/polyaniline (Pani) during polymerization.

FIG. 10 shows the CD spectra of DNA and DNA/polyaniline during polymerization.

FIG. 11 shows the CD spectra of DNA; a mixture of DNA, aniline monomer and horseradish peroxidase (HRP); DNA and $NH_4F$; and DNA/polyaniline.

FIG. 12A shows the CD spectra of DNA/polyaniline as the pH is increased from 4 to 10.

FIG. 12B shows the CD spectra of DNA/polyaniline as the pH is decreased from 10 to 4.

FIG. 13A shows the UV-Vis spectra of DNA/polyaniline as the pH is increased from 4 to 10.

FIG. 13B shows the UV-Vis spectra of DNA/polyaniline as the pH is decreased from 10 to 4.

DETAILED DESCRIPTION OF THE INVENTION

The features and other details of the apparatus and method of the invention will now be more particularly described and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

Figure 1:
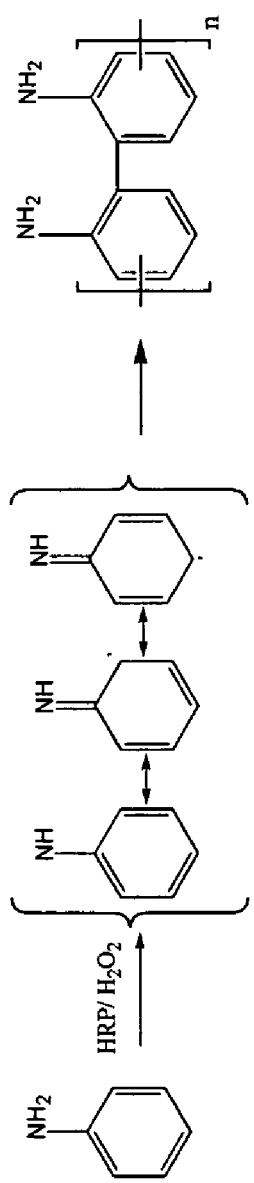
FIG. 1 shows the general mechanism of enzymatic polymerization of aniline in the absence of the polynucleotide, promoting ortho- and para-directed reactions.

Enzyme-catalyzed polymerization of aniline typically involves reaction at the ortho and para positions of the aromatic ring as shown in FIG. 1. This mechanism often results in branched polymeric materials which are intractable and have negligible electrical and optical properties. This invention describes a novel template assisted enzymatic polymerization which results in a new class of polyanilines. In general, the polyanilines formed by the enzymatic template guided polymerization described herein are linked at the para-position (see FIG. 2) and, therefore, are less branched than they generally would be as a result of some other polymerization method.

In one embodiment, the invention is a composition of matter that includes a polynucleotide template and a polyaniline bound together as a complex. A method of the invention includes preparing a polynucleotide/polyaniline complex by combining an aniline monomer, a polynucleotide template and a redox enzyme. The monomer aligns along the template to form a complex and polymerizes to form polyaniline, thereby forming the polynucleotide/polyaniline complex.

Typically, enzymatic template guided polymerization reactions of the invention are carried out in water. However, other solvents can be include, for example, dimethyl formamide, dimethyl sulfoxide, methanol, ethanol, dioxane, etc. The pH of the solvent is adjusted to a pH in a range of between about 4.0 and about 10.0. Preferably, the pH is between about 4.0 and about 5.0 for aniline monomer. Examples of suitable buffers include Tris-HCl buffer, sodium phosphate, sodium citrate, etc. When the template used is a polynucleotide, the preferable buffer is sodium citrate.

A suitable redox enzyme is added to the reaction mixture. The concentration of enzyme in the reaction mixture is sufficient to significantly increase the polymerization rate of the monomer in the reaction solution. Typically, the concentration of enzyme in the reaction mixture is in a range of between about one unit/ml and about five units/ml where one unit will form 1.0 mg purpurogallin from pyrogallol in 20 seconds at pH 6.0 at 20° C. Examples of suitable enzymes include peroxidases, laccase, etc. Preferred enzymes are peroxidases. A particularly preferred enzyme is horseradish peroxidase.

Monomers which are suitable for the template polymerization reaction are monomers which can be polymerized by enzymatic, redox polymerization to form a conductive and/or optical active polymer. Such monomers are defined herein as "redox monomers". Examples of suitable redox monomers include substituted or unsubstituted anilines and substituted or unsubstituted phenols. Therefore, the polyaniline or polyphenol formed can be substituted or unsubstituted. The monomer can be a neutral compound, a cation or an anion. Further, the monomer can be, for example, a dye, such as an azo compound, or a ligand. Alternatively, an oligomer can be employed rather than a monomer. Mixtures of different monomers, oligomers, or of monomers and oligomers, can also be employed. In one embodiment, oligomers can form from the monomer prior to association or complexation with a template. The concentration of monomer in the reaction mixture generally is in a range of between about 0.05 mM and about 100 mM.

A polynucleotide template preferably is present in an amount that at least causes a portion of the aniline monomer present to bind to the polynucleotide template and that causes at least a portion of the monomer to polymerize while bound to the template. A "polynucleotide template," as that term is employed herein, is defined as a nucleotide polymer or oligomer that can bind, such as by ionic binding, a redox monomer before and during polymerization of the monomer, whereby the monomer polymerizes. When aniline is the redox monomer, the template facilitates coupling of the aniline monomers predominately at the para position of the aromatic ring. It is believed that binding of aniline monomers can affect polymerization of adjacent monomers along the polynucleotide template, thereby controlling polymerization, and that the negatively charged polynucleotide backbone forms electrostatic bonds with aniline monomers, thus causing them to align along the backbone of the polynucleotide template. When the redox monomers are polymerized a polynucleotide/conductive polymer complex is formed. When aniline monomers are polymerized in the presence of a polynucleotide template a polynucleotide/polyaniline complex is formed.

In alternative embodiments, other polymers or oligomers can be employed as templates for polymerization. For example, sulfonated polystyrene, sulfonated polystyrene polyion salts, polypeptides, proteins, biological receptors, zeolites, caged compounds, azopolymers, and vinyl polymers, such as polyvinyl benzoic acid, polystyrene sulfonic acid and polyvinyl phosphonates, poly(vinyl phosphonic acid), etc can be suitable templates. The template can be an anion or cation, such as a polyanion or a polycation. Further, the template can be an optically active polyelectrolyte, for example, azo polymers. The template can also be a dendrimer or a compound that forms micelles, for example, dodecyl benzene sulfonic acid. The monomer or oligomer associates with the template to form, for example, a complex. After polymerization, the complex can be electrically or optically active.

The polymerization reaction is a redox reaction and typically is initiated by adding a suitable oxidant, such as a hydrogen peroxide solution, etc. In one embodiment, the hydrogen peroxide has a concentration in the polymerization solution in a range of between about one millimolar and about five millimolar. To avoid or minimize denaturation of the enzyme, a dilute solution of hydrogen peroxide can be prepared from a 30% stock solution and added slowly to the reaction with stirring. Preferably, the dilute solution of hydrogen peroxide is about 0.1 M to about 0.001 M. Typically, the reaction mixture is maintained at a temperature in a range of between about 10° C. and about 25° C. during polymerization. More preferably, the temperature of the reaction mixture is maintained at a temperature of about 20° C. during polymerization.

The resulting polymer can be, for example, a linear polymer, such as an extended linear polymer intertwined with the template. Alternatively, the polymer can be dendritic, or branched. In any case, the polymer can have a conformation that would not be produced in the absence of the template.

In one embodiment, the polymer can be polyaniline complexed with a polynucleotide template, wherein the polyaniline is an extended linear, helical or branched polymer intertwined with the polynucleotide template. In a specific embodiment, the polyaniline is a component of a water soluble electrically conducting complex.

Optionally, the method of the invention includes forming a layer of the polymer on a surface. In this embodiment, the pH of the polymer solution is reduced to a suitable pH, such as a pH in a range of between about 2.0 and about 8.0, by adding a suitable acid, such as hydrochloric acid, etc. A suitable surface, such as a glass slide treated with an alkali, such as Chemsolv® alkali, is immersed in a polymer solution for a sufficient period of time to cause the polymer to accumulate at the surface. In one embodiment, a glass slide is immersed in a polymer solution for about ten minutes and then removed. The surface can then be washed with water at a pH of about 2.5 in order to remove unbound polymer from the surface.

Distinct layers of polymers can be applied to a surface by this method. For example, an initial layer can be formed by exposing a suitable surface to a polymer formed by the method of the invention that is a polyanion and then subsequently exposing the same surface, having the polyanion deposited upon it, into a solution of a polycation. In one specific embodiment, a glass slide treated with Chemsolv® alkali is exposed to a one milligram/milliliter solution of poly(diallyl dimethyl ammonium chloride) at a pH of 2.5 as a polycation, and then exposed to a one milligram/milliliter solution of SPS/polyaniline formed by the method of the invention, as a polyanion. A bilayer of polymers is thereby formed. Additional layers of these or other polymers can subsequently be applied.

Polymerization of the template can be initiated simultaneously with, or subsequent to alignment and polymerization of the bound monomer or oligomer. In one embodiment, the template can be removed from the resulting polymer, such as by decomposition, dissolution, or enzymatic degradation to leave behind a polymer shell.

In one specific embodiment of the method of the invention, the template-assisted enzymatic polymerization of aniline can be carried out in an aqueous solution using 0.1M sodium phosphate or tris-HCl buffer and a pH ranging from about 4.0 to about 10.0. Aniline monomer typically can be added in a range of between about 10 mM and about 100 mM, and an appropriate amount of a template, in this case sulphonated polystyrene (SPS) (molecular weight of 70,000), can be added in ratios ranging from about 1:10 to about 10:1 SPS/aniline. The enzyme horseradish peroxidase then can be added to the reaction mixture in a range of about one unit/ml to about five units/ml. To initiate the reaction, an oxidizer, such as a 30% solution of hydrogen peroxide, can be added slowly in 10 $\mu$l increments over a reaction time of 3 hours, with constant stirring to a final concentration ranging from about 10 mM to about 100 mM.

In another specific embodiment of the invention, the template guided polymerization of aniline can be carried out using a polynucleotide template. The polynucleotide is dissolved in an aqueous buffer, such as a 10 mM sodium citrate buffer, having a pH of about 4 to about 10. Preferably, the buffer pH is about 4 to about 5. The concentration of the polynucleotide can be determined by UV absorption using the molar extinction coefficient of the polynucleotide at a particular wavelength. This gives the concentration of nucleotide bases which make up the polynucleotide. The molar extinction concentration of a polynucleotide in the polymerization reaction is typically about 1 mM to about 5 mM. Aniline monomer is added to the polynucleotide solution in a concentration such that the ratio of aniline to nucleotide bases in the polynucleotide is about 1:10 to about 10:1, more preferably about 1:1. Horseradish peroxidase (HRP) is added to the solution to a concentration of about 1 unit/mL to about 5 units/mL, then an oxidizer, such as hydrogen peroxide, is added slowly to the reaction mixture to initiate the reaction. The amount of hydrogen peroxide added is about one-fifth equivalent to about 1.0 equivalents of the aniline monomer in the reaction mixture. The reaction time is typically about 80 min.

In yet another specific embodiment of the method of the invention, the template-assisted enzymatic polymerization of phenol can be carried out in an aqueous solution using 0.1M sodium phosphate or tris-HCl buffer and pH ranging from 4.0 to 10.0. Phenol monomer typically can be added in a range of between about 10 mM and about 100 NM and an appropriate amount of the template, sulphonated polystyrene (molecular weight of 70,000), can be added in ratios ranging from about 1:10 to about 10:1 SPS/phenol. The enzyme horseradish peroxidase then can be added to the reaction mixture in a range of about one unit/ml to about five units/ml. To initiate the reaction, an oxidizer, such as a 30% solution of hydrogen peroxide, can be added slowly in about 10 μl increments over a reaction time of about 3 hours with constant stirring to a final concentration ranging from about 10 mM to about 100 mM.

Figure 2:
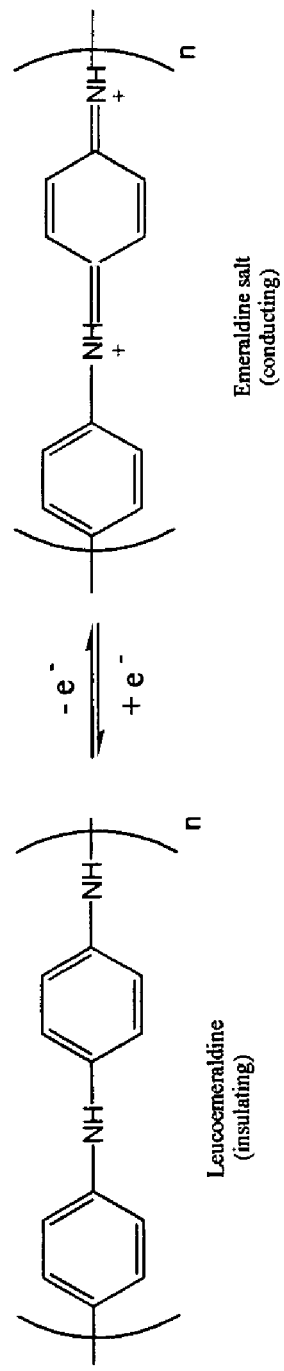
FIG. 2 shows the chemical structure of oxidized (conducting) and reduced (insulating) forms of the polyaniline which is formed during enzymatic template guided polymerization.

It is to be understood that polymers formed by the method of the invention can be formed in an oxidized, electrically conducting form or in a reduced, insulating form of the polymer (see FIG. 2). Other physical properties of the polymers that can be affected by the method of the invention include the molecular weight and shape of the polymer. It is also to be understood that the polymers formed by the method of the invention can be modified after polymerization. For example, modification can be made at amine functional groups to form amides or imine groups.

Dissolved polymers formed by the method of the invention can be precipitated from solution by adjusting the pH with a suitable acid or base. Examples of suitable acids or bases include hydrochloric acid, sodium hydroxide, etc.

In a preferred embodiment, a polynucleotide duplex can be used as a template for polymerization of polyaniline. Polynucleotide duplexes have a handedness and, therefore, may impose a chirality on the polyaniline to which they are complexed. Alternatively, the polyaniline complexed to a polynucleotide duplex may be achiral.

The conformation of the polynucleotide duplex complexed to a conductive polymer can be controlled by controlling the degree of oxidation of the conductive polymer. In general, the more positive charges the backbone of the conductive polymer carries, the more tightly wound the double helix will be. For example, the conformation of the polynucleotide duplex in a polynucleotide/polyaniline complex can be controlled by controlling the degree of oxidation of the polyaniline. When polyaniline is in the conducting, or oxidized, form, where the polyaniline is protonated (see FIG. 2), the polynucleotide duplex is more tightly wound (e.g., has more base pairs per helical repeat) than when polyaniline is in the insulating, or reduced form, where the polyaniline is neutral. Polyaniline can be converted from the insulating form to the conducting form by adding protons to (or subtracting electrons from) the polyaniline backbone. This oxidation process is called "doping" the polyaniline. Conversely, the polyaniline can be dedoped, or reduced, by subtracting protons from (or adding electrons to) the polyaniline backbone. When a polynucleotide/polyaniline complex is in solution, it can be doped (oxidized) by decreasing the pH of the solution, or dedoped (reduced) by increasing the pH of the solution.

Alternatively, the polyaniline in the complex can be doped or dedoped electrochemically using, for example, a potentiostat/galvanostat set-up. The potentiostat/galvanostat set-up can have, for example, a three-electrode cell with platinum wire as the working electrode, Ag/AgCl as the reference electrode and platinum mesh as the counterelectrode. The polynucleotide/polyaniline complex can be contained in an electrolyte solution, such as a sodium citrate buffer having about 0.1 M ammonium chloride in contact with the working electrode. The doping and dedoping process may be observed by cycling the potential between about −0.02 V and 0.8 V with respect to the Ag/AgCl electrode.

Therefore, the conformation of the polynucleotide duplex in a polynucleotide/polyaniline complex can be modulated by changing the oxidation state of the polyaniline. After oxidation or reduction of the polyaniline, the polynucleotide duplex can recover its original conformation, or substantially the same conformation as its original conformation, by returning the polyaniline to its original, or near its original oxidation state. A polynucleotide duplex has substantially the same conformation if the conformation, as determined by circular dichroism (hereinafter "CD"), is at least about 75% the same.

Another embodiment of the invention is an electrical component. The electrical component includes an electrical element, such as, a voltage source, a resistor, a capacitor, an inductor, a diode, a switch or a transistor, which is attached to one or more nanowires. A nanowire, as that term is employed herein, includes a polynucleotide and a conductive polymer, such as polyaniline, bound together as a complex.

The polynucleotide in the nanowire can be a single strand, a double helix or a portion of the polynucleotide can be a single strand and a portion of the polynucleotide can be a double helix. In addition, the polynucleotide can be a deoxyribonucleotide, a ribonucleotide, a polynucleotide analog, a modified polynucleotide or an oligonucleotide. Also encompassed within the invention are polynucleotides that are a combination of deoxyribonucleotide, a ribonucleotide, a polynucleotide analog, a modified polynucleotide and an oligonucleotide.

An electrical element can be connected to one or more other electrical elements by a nanowire. The electrical elements can be connected to each other in a closed electrical path, or a path that can be closed by an electrical switching element, to form a circuit. When the nanowire is used to connect two or more electrical elements, the nanowire can be self-assembled by hybridization. In this embodiment, each electrical element has one or more polynucleotides attached to it, a portion of which can hybridize to a portion of a polynucleotide on a different electrical element. Alternatively, a polynucleotide connector which can hybridize a portion of the sequence of two or more polynucleotides that are attached to different electrical elements can be use to connect the two elements. The polynucleotide connector can be one or more polynucleotides. When the connector is composed of more than one polynucleotide, at least a portion of each polynucleotide that makes up the connector is hybridized to one or more other polynucleotides in the connector.

The polynucleotide is attached to a surface of the electrical element by derivatizing the polynucleotide with a group that can bind to the surface. Therefore, selection of a functional group with which the polynucleotide is to be derivatized is dependent on the type of material to which the polynucleotide is to be attached. When the polynucleotide is to be attached to a surface on an electrical element which is gold, silver, copper, cadmium, zinc, palladium, platinum, mercury, lead, iron, chromium, manganese, tungsten, or any alloys of the above metals, the polynucleotide to be attached is preferably derivatized with a thiol, sulfide or disulfide group. When the surface to which the polynucleotide is to be attached is doped or undoped silica, alumina, quartz or glass, the polynucleotide is preferably derivatized with a carboxylic acid. When the surface to which the polynucleotide is to be attached is platinum or palladium, the polynucleotide is preferably derivatized with a nitrile or isonitrile group. Finally, when the surface to which the polynucleotide is to be attached is copper, the polynucleotide is preferably derivatized with a hydroxamic acid group.

The invention also relates to a method of forming an electrically conductive connection between one or more electrical elements. The electrically conductive connection is formed by connecting two or more electrical elements with a polynucleotide. The polynucleotide is contacted with a redox monomer, such as an aniline monomer, and a redox enzyme, whereby the redox monomer aligns along the polynucleotide and is polymerized. The polynucleotide/conductive polymer complex (nanowire) formed connects the electrical elements and is electrically conductive.

The polynucleotide connecting two or more electrical elements can self-assemble by hybridization. In this embodiment, the entire polynucleotide, or a portion thereof, that is attached to an electrical element, hybridizes to a complementary, or substantially complementary, polynucleotide, or a portion of a polynucleotide, attached to a different electrical element. The specificity of hybridization allows specific connections between electrical elements to be predetermined by determining the sequence of the polynucleotide attached to each electrical element. The polynucleotides hybridize forming the predetermined connections when they are combined in a solution having the appropriate conditions of temperature and chemical composition.

In another embodiment, a polynucleotide attached to an electrical element can be enzymatically ligated to a polynucleotide attached to another element. Ligases are enzymes which repair damaged DNA. An example of a suitable ligase is T4 DNA ligase. In this embodiment, the polynucleotides attached to each electrical element are double helixes which preferable have at least one cohesive, or sticky end, on the end of the duplex which is not attached to the electrical element. The term "cohesive end" refers to a single stranded polynucleotide which occurs at the terminal end of a double helix. The cohesive end is typically from three to twenty, preferably three to eight, bases long and can hybridize to a complementary cohesive end. Once two complementary cohesive ends have hybridized a ligase can form covalent bonds between the two duplexes.

The term "self-assembled polynucleotide" refers to either specific hybridization between polynucleotides attached to two different electrical elements or to hybridization of two cohesive ends followed by ligation. A nanowire formed using a self-assembled polynucleotide template is a self-assembled nanowire. Self-assembly of nanowires to form specific connection between electrical elements is expected to facilitate the construction of nanometer-scale devices.

A redox monomer and a redox enzyme are added to the solution containing the electrical elements having attached polynucleotide templates either simultaneously with the electrical elements or, preferably, after the polynucleotides attached to the electrical elements have hybridized. The redox monomers, for example, aniline monomers align along the hybridized polynucleotides to form a complex and are polymerized, thereby connecting the electrical elements with a nanowire having a conductive and/or optically active polymer complexed to a polynucleotide.

Another embodiment of the invention is a method of identifying a target polynucleotide by contacting the target polynucleotide with a probe which includes a polynucleotide/conductive polymer complex that can bind to a target polynucleotide by hybridization. Hybridization of the probe to the target polynucleotide modifies at least one electromagnetic property of the conductive polymer. Preferably, substituted or unsubstituted polyaniline is the conductive polymer. The probe can bind by hybridization to a target polynucleotide which is complementary, or substantially complementary, to the sequence, or a portion of the sequence, of the probe polynucleotide. The electromagnetic property of the conductive polymer which is modified is an optical and/or electrical property. The change in optical and/or electrical properties of the conductive polymer during or after hybridization with the target can be used in discriminating between perfectly complementary targets and targets that have one or more mismatches. In another embodiment, the conductive polymer can be complexed to the target polynucleotide, as well as the probe. In this embodiment, the conductive polymer is enzymatically polymerized on the target polynucleotic. The modified electromagnetic property can be detected by a combination of characterization methods that may include, but are not limited to, UV-visible absorption, circular dichroism and cyclic voltammetry. These characterization methods can be employed to estimate the extent of hybridization. Discrimination between targets which are perfectly complementary to the probe and those which have one or more mismatches may also be discerned by monitoring the optical and/or electrical properties during thermal melting of the hybridization complex of the probe and the target. In addition, the polynucleotide/conductive polymer complex of the probe may be may be attached to an electrical element.

A "polynucleotide" as used herein refers to single, double and triple stranded polynucleotides, as well as, quadruplexes. The polynucleotide in a polynucleotide/polyaniline complex can be a deoxyribonucleotides, ribonucleotides (hereinafter, "RNA"), modified polynucleotides, and polynucleotide analogs such as peptide nucleic acid (hereinafter, "PNA") and morpholino nucleic acids. In addition, a polynucleotide can be composed of more than one polynucleotide molecule. For example, a polynucleotide duplex can be composed of two polynucleotides of the same type (e.g., both ribonucleotides or both deoxyribonucleotides), or it can be composed of a mixture of different types of polynucleotides (e.g., a combination of a ribonucleotide and a deoxyribonucleotide).

Complementary binding, or hybridization, is generally understood to occur in an antiparallel manner, however, there are occasions in which hybridization can occur in a parallel fashion, such as in a triple helix, and this arrangement is also within the scope of the present invention. Hybridization is understood to essentially follow a complementary pattern wherein a purine pairs with a pyrimidine via hydrogen bonds. More particularly, it is understood that when hybridization occurs, complementary base-pairing of individual base pairs generally follows Chargaff's Rule wherein an adenine pairs with a thymine (or uracil) and guanine pairs with cytosine. However, hybridization can occur between less than perfectly complementary sequences provided a stable binding complex is formed. The stability of a binding complex is dependent on ionic strength, temperature and the concentration of destabilizing agents such as urea and formamide in the hybridization medium, as well as, on factors such as the length of the polynucleotide sequence, base composition, and percent mismatch between hybridizing sequences.

In addition, modified bases can account for unconventional base-pairing. A modified polynucleotide is understood to mean herein a DNA or RNA polynucleotide that contains chemically modified nucleotides. The term "polynucleotide analogue" is understood herein to denote non-nucleic acid molecules such as PNA (see Egholm, et al., *J. Am. Chem. Soc.* (1992), volume 114: page 1895, the teachings of which are incorporated herein by reference) and morpholino antisense oligomers (see Summerton and Weller, Antisense and Nucleic Acid Drug Dev. (1997), volume 7: page 187 that can engage in base-pairing interactions with conventional nucleic acids. These modified bases and polynucleotide analogues are considered to be within the scope of the instant invention. For example, polynucleotides containing deazaguaine and uracil bases can be used in place of guanine and thymine, respectively, to decrease the thermal stability of hybridized complex. Similarly, 5-methylcytosine can be substituted for cytosine in hybrids if increased thermal stability is desired. Modification to the sugar moiety can also occur and is embraced by the present invention. For example, modification to the ribose sugar moiety through the addition of 2'-O-methyl groups which can be used to reduce the nuclease susceptibility of RNA molecules. Modifications occurring with different moieties of the nucleic acid backbone are also within the scope of this invention. For example, the use of methyl phosphate or methyl phosphonate linkages to remove negative charges from the phosphodiester backbone can be used.

Polynucleotides can bind to each other to form specific binding complexes by complementary base-pairing interactions between the polynucleotides. Possible base-pairing interactions useful in the method include duplexes that have canonical Watson-Crick base-pairing (reviewed in Cantor and Schimmel, Biophysical Chemistry, Part I: The Conformation of Biologial Macromolecules, Ch. 3 and 6, Freeman, San Francisco, 1980, the teachings of which are incorporated herein by reference in their entirety) or noncanonical base-pairing schemes such as triple helix formation (Felsenfeld, Davies, and Rich, J. Am. Chem. Soc. (1957) 79:2023; for reveiw see Doronina and Behr, Chem. Soc. Rev. (1997), p. 63–71 , the teachings of which are incorporated herein by reference in their entirety) and quadruplex formation (Sen and Gilbert, Nature (1990) 344:410–414; Sen and Gilbert, Methods Enzymol (1992) 211:191–9, the teachings of which are incorporated herein by reference in their entirety.) Methods for determining the thermal stability of a particular hybridization complex are well known in the literature (see Wetmur, Critical Reviews in Biochemistry and Molecular Biology, 26:227–259 (1991): Quartin and Wetmur, Biochemistry, 28:1040–1047 (1989), the teachings of which are incorporated herein by references in their entirety.

The invention will now be further and more specifically described by the following examples. All parts and percentages are by weight unless otherwise specified.

EXAMPLES

Example 1

A. Materials and Methods

Horseradish peroxidase (HRP) (enzyme classification number (EC) 1.11.1.7), phosphate and Tris-HCl buffers were obtained from Sigma Chemicals Company, St. Louis, Mo. Aniline, sulfonated polystyrene (SPS) and hydrogen peroxide (30%) were obtained from Aldrich Chemicals, Inc., Milwaukee, Wis. All the chemicals were used as received.

B. Results and Discussion

Figure 3:
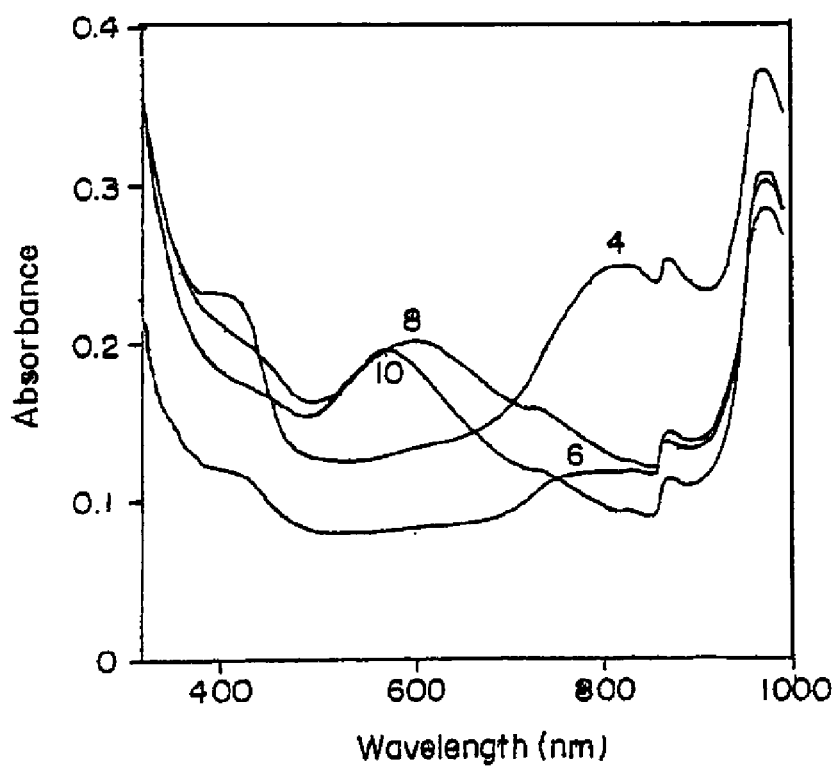
FIG. 3 shows the visible absorption spectra of the polyaniline template complex (0.05M aniline to 0.1M sulfonated polystyrene (SPS)) formed at various pH's.

The progress of a template-assisted polymerization reaction of aniline in the presence of the polyelectrolyte, sulfonated polystyrene (SPS) in a 1:1 ratio, was monitored by the change in visible absorbance. A Perkin-Elmer Lambda-9® UV-Vis-near IR spectrophotometer was used for the spectral characterization of the polymer. FIG. 3 shows the visible absorption spectra of the sulfonated polystyrene/polyaniline (SPS/PA) complex prepared under various pH conditions of 4, 6, 8, and 10. As shown in FIG. 3, SPS/PA, prepared at a pH of 4, exhibited a strong absorbance maximum at approximately 780 nm. This was indicative of the emeraldine, or oxidized, electrically conducting form of polyaniline. Polymerization at higher pH resulted in an absorption maximum of about 600 nm, indicating a more insulating form of polyaniline. In all cases, the polymer complex did not precipitate out of solution, indicating that complexation of the polyaniline to the SPS had occurred.

Figure 4:
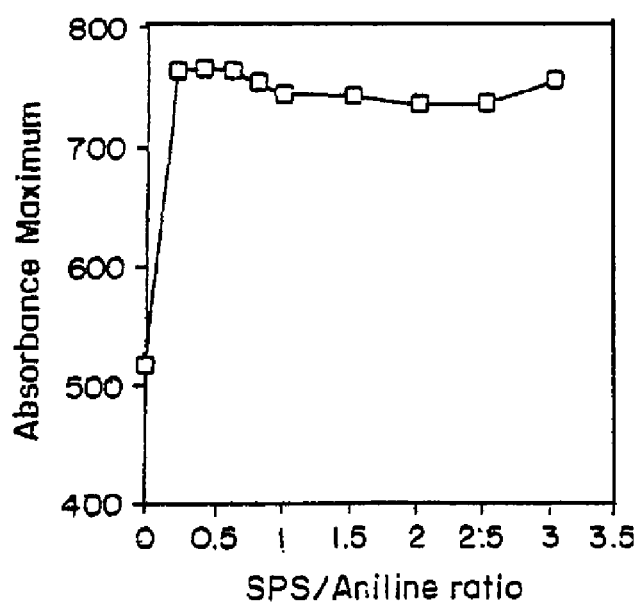
FIG. 4 shows a plot of absorbance versus (SPS)/aniline ratio to find the optimum dopant-to-monomer ratio.

Optimization of the molar ratio of monomer to polyelectrolyte template (repeat unit) was carried out. FIG. 4 shows a plot of absorption maxima for various SPS/aniline ratios. As shown, a ratio of 1:2, SPS/aniline was the minimum ratio required to obtain the electrically conducting form of polyaniline, which had an absorption maximum at approximately 780 nm at a pH in a range of between about 4 and about 5.

Figure 5A:
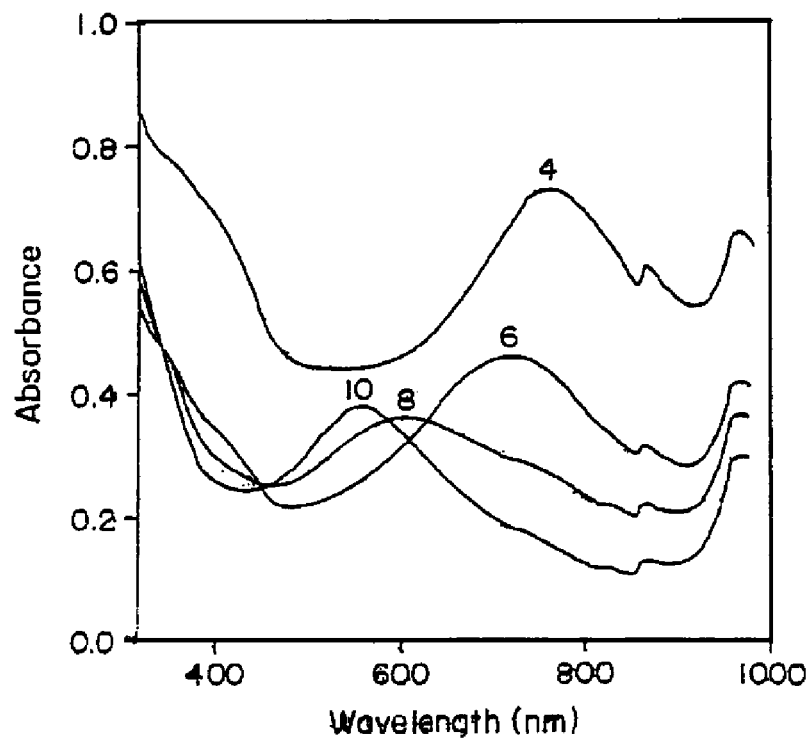
FIG. 5A shows the visible absorption and redox behavior of polyaniline/SPS prepared at pH 4.0 with increasing pH.
Figure 5B:
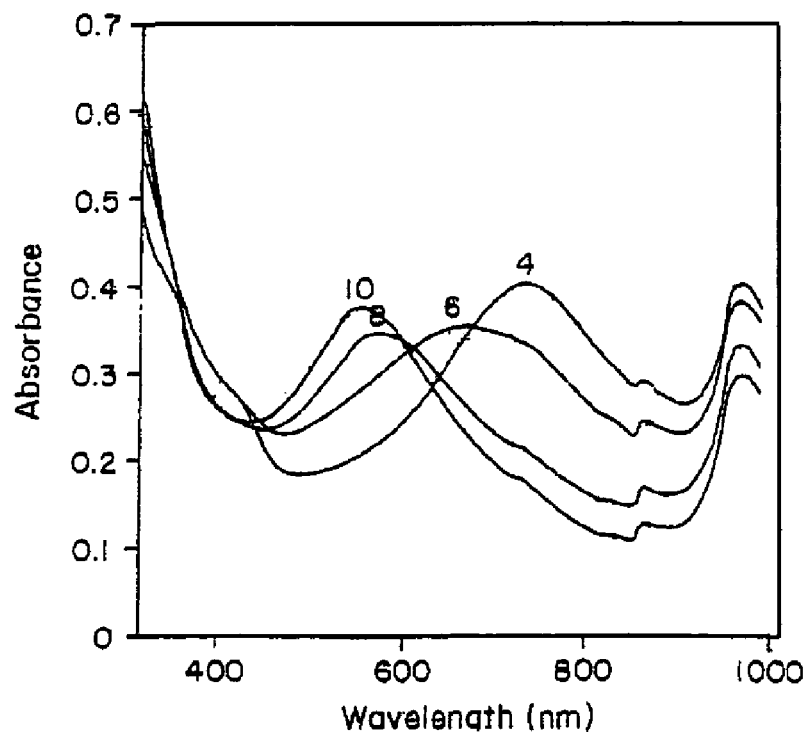
FIG. 5B shows the visible absorbance and redox behavior of polyanilines/SPS prepared at pH 4.0 with decreasing pH.

The reversible reduction/oxidation (redox) behavior of the SPS/PA complex was monitored by measuring visible absorption of the complex under various pH conditions. In all cases the polymer complex was prepared at pH 4.0 to obtain the electrically active form of the polyaniline and then the pH of the solution was adjusted for the absorption maxima measurements. As shown in FIG. 5A, the SPS/PA complex shifted in absorption maxima to shorter wavelengths as the pH of the solution was increased. This was indicative of reduction of the polyaniline backbone to a more insulating state. FIG. 5B shows the reverse behavior where the absorption maximum was found to shift back to longer wavelengths with decreasing pH conditions. This was indicative of oxidation of the polyaniline backbone back to a more electrically conductive state. This reversible redox behavior was repeatable and confirms that an electrically active form of polyaniline was present in the final SPS/PA template complex. Molecular weight determination was carried out by column chromatography using Protein PAK 300 SW®-Waters Association columns. Molecular weights of approximately 74,000 Daltons were measured indicating polymerization of the aniline and complexation to the SPS template.

C. Thin Films by Layer-by-Layer Technique

Self-assembly of the SPS/PA complex onto glass slides was carried out by the layer-by-layer electrostatic deposition technique (Ferreira, M., et al., Thin Solid Films (1995), volume 244: page 806 and Decher, G., et al., Thin Solid Film, (1992), pages 210–211). A glass slide treated of with alkali (Chemsolv® alkaline) was exposed to polycation and polyanion solutions repeatedly to transfer monolayers of these polyelectrolytes per every exposure. 1 mg/ml solution of poly(diallyl dimethyl ammonium chloride) (PDAC) at pH 2.5 was used as the polycation while approximately 1 mg/ml solution of SPS/PA at pH 2.5 was used as the polyanion. The glass slide was exposed to each polyelectrolyte solution for 10 minutes and washed with water at the same pH to remove the unbound polymer from the surface. This process was repeated to obtain the desired number of layers.

Figure 6A:
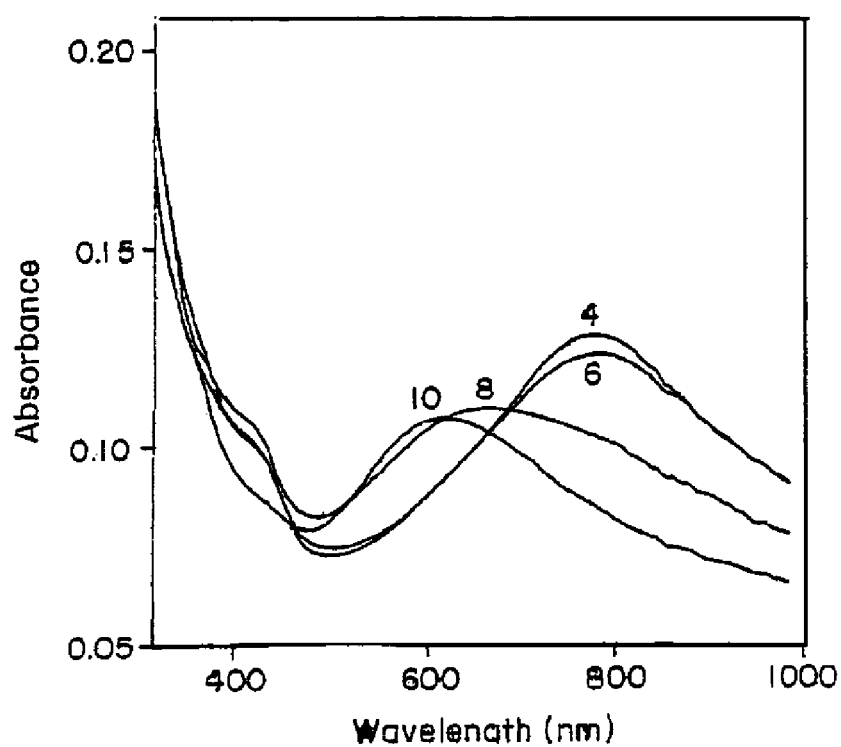
FIG. 6A shows the visible absorbance and redox behavior of a 50 bilayer film of poly(diallyl dimethyl ammonium chloride) (PDAC) alternating with SPS/polyaniline (prepared at pH 4.0) with increasing pH.
Figure 6B:
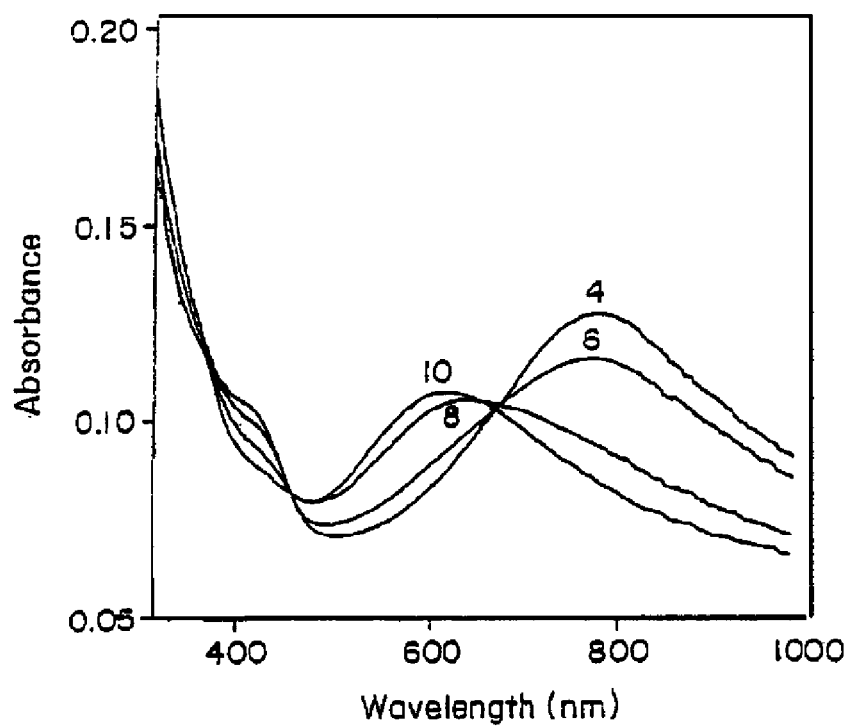
FIG. 6B shows the visible absorbance and redox behavior of a 50 bilayer film of SPS/polyaniline (prepared at pH 4.0) with decreasing pH.

FIGS. 6a and 6b show the visible absorption spectra of a film of fifty bilayers wherein PDAC layers alternate with SPS/PA layers, under various pH conditions. As shown in the figures, the multilayer film exhibited similar redox behavior as was observed previously with the solution absorption spectra. This confirmed that facile electrostatic deposition was feasible with the SPS/PA polymer complex and that the electrical activity was maintained after deposition. In addition, multilayer and bulk films were prepared on indium tin oxide (ITO) slides and four-point probe conductivity measurements were taken. The results gave polymer-complex conductivities in the range of $10^{-3}$ to $10^2$ S/cm.

Example 2

A. Materials and Methods

Horseradish peroxidase (HRP) (enzyme classification number (EC) 1.11.1.7), phosphate and Tris-HCl buffers were obtained from Sigma Chemicals Company, St. Louis, Mo. Phenol, sulfonated polystyrene (SPS) and hydrogen peroxide (30%) were obtained from Aldrich Chemicals, Inc., Milwaukee, Wis. All the chemicals were used as received.

B. Results and Discussion

Figure 7A:
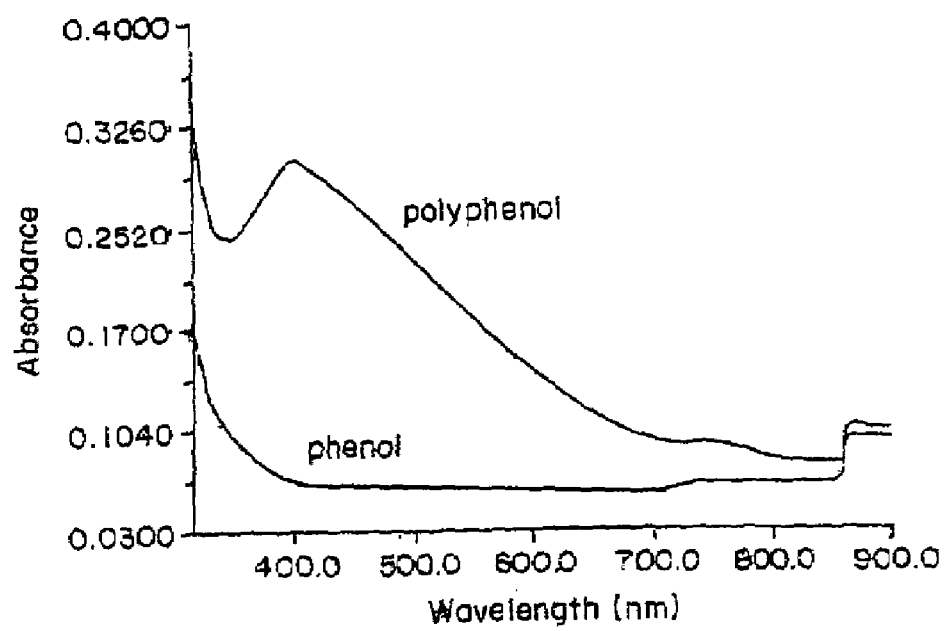
FIG. 7A shows the visible absorbance of polyphenol without SPS versus phenol monomer. Polyphenol precipitated out of solution as a result of polymerization.
Figure 7B:
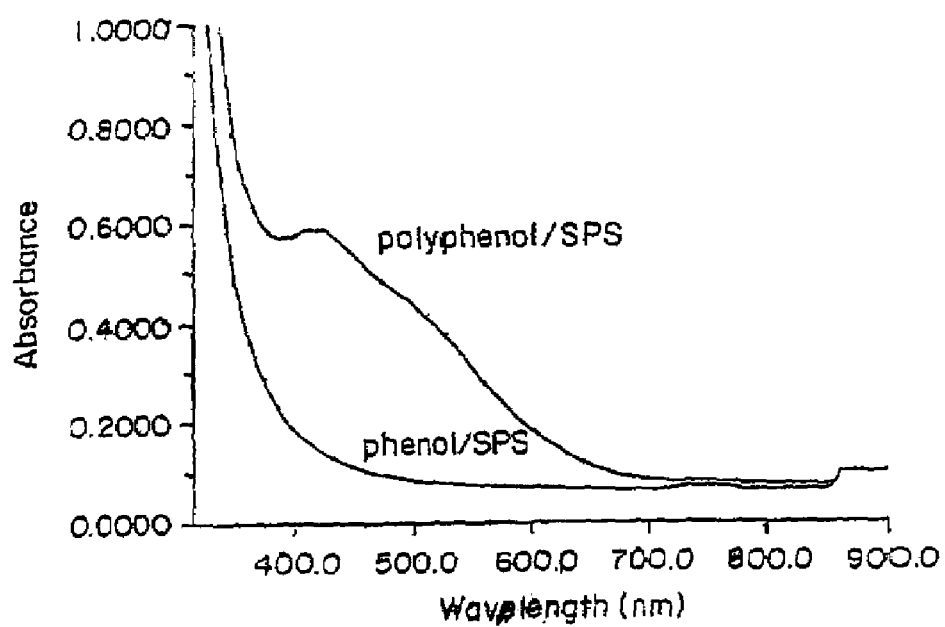
FIG. 7B shows the visible absorbance of polyphenol/SPS template versus phenol monomer. The polyphenol did not precipitate out of solution.

The progress of a template-assisted polymerization reaction of phenol in the presence of the polyelectrolyte, sulfonated polystyrene (SPS) in a 1:1 ratio, was monitored by the change in visible absorbance. Perkin-Elmer Lambda-9 UV-Vis-near IR spectrophotometer was used for the spectral characterization of the polymer. FIG. 7A shows the visible absorption of polyphenol without SPS, versus phenol monomer. As shown, there was a significant absorption maximum in the visible spectrum upon polymerization, indicating formation of polyphenol. However, with time the polymer began to precipitate out of solution. FIG. 7B shows the visible absorption of polyphenol with SPS, versus phenol monomer. As shown again, there was a significant absorption maximum of the polymerized system in the visible spectrum. In this case, there was no observed precipitation of the polymer complex out of solution.

Molecular weight determination was carried out by column chromatography using Protein PAK 300 SW® columns manufactured by Waters Association. Molecular weights as large as 136,000 Daltons were measured, indicating polymerization of the phenol and complexation to the SPS template.

Example 3

A. Preparation of DNA-Polyaniline Complex

Horseradish peroxidase (HRP, EC 1.11.1.7) type II, (150–200 units/mg) solid was purchased from Sigma Chemical Co. (St. Louis, Mo.). Calf Thymus DNA was purchased from Worthington Biochemical Corporation (Freehold, N.J.). Aniline monomer (purity 99.5%) and hydrogen peroxide (30% by weight) were purchased from Aldrich Chemicals, Inc., Milwaukee, Wis., and were used as received. All other chemicals were of reagent grade or better. All glassware and plasticware were sterilized by autoclaving for 30 minutes.

A stock solution of calf Thymus DNA (19.9 mg) was dissolved in 40 ml of sterile, 10 mM sodium citrate buffer maintained at pH 4. The solution was stored in the refrigerator for 48 hours before reaction. The concentration of DNA was determined by the UV absorbance at 258 nm. The molar extinction coefficient ($\epsilon$) at 258 nm was taken as 6420 1 $mol^{-1}$ $cm^{-1}$, as reported by Sprecher, et al., Biopolymers (1979), 18:1009. The reaction mixture had 10 ml of DNA stock solution, aniline in an amount equivalent to twice the molar concentration of DNA present in 10 ml and catalytic amount of HRP (0.15 mg). The polymerization was carried out by the dropwise addition of hydrogen peroxide (0.098 M), over a period of 240 seconds. The total amount of hydrogen peroxide was limited to $\frac{1}{8}^{th}$ of the stoichiometric amount, calculated with respect to aniline concentration. For synthesis in bulk, the polymerization was carried to completion and a stoichiometric amount of hydrogen peroxide was added. The DNA-polyaniline complex precipitates out from the mixture. The precipitate was washed several times using 1:1 mixture of acetone and pH 4 water in order to remove residual aniline and low molecular weight polyaniline. The gravimetric yield was 75%. Results of elemental analysis of the DNA-polyaniline complex indicated C (46.8%), H (4.4%), P (5.45%). This indicated a ratio of 2.5:1 for DNA to aniline in the complex. The theoretically values calculated based on this ratio are C (43.2%), H (5.0%), N (13.1%), P (4.8%).

UV-Vis spectra and circular dichroism (CD) spectra were obtained simultaneously using Hewlett-Packard diode array detector photometer (type HP8452A) and Jasco CD spectrometer J-720, respectively. The elemental analysis was performed by Schwarzkopf Microanalytical Laboratory, Woodside, N.Y.

B. Results and Discussion

At pH 4, the aniline molecules are protonated, and the electrostatic attraction between protonated aniline and the phosphate groups of the DNA helps in aligning the monomer on DNA (FIG. 8). The alignment of the monomer on the DNA promotes para-directed coupling of aniline molecules during polymerization (FIG. 2). The phosphate groups in the DNA matrix provide a proton-rich environment that helps in accomplishing polymerization of aniline at a significantly higher pH condition than is possible in the absence of the DNA template. The polymerization is catalyzed by HRP, and the polyaniline formed remains bound through ionic interactions to the DNA.

C. Formation of Polyaniline on DNA (UV-Vis Spectra)

The UV-Vis spectra of DNA, DNA with aniline and HRP before and during polymerization are shown in FIG. 9. The addition of aniline and HRP increased the absorption in the 200–280 nm range, while the absorption in the visible region remained constant. UV-Vis spectra were recorded 5 minutes after the addition of hydrogen peroxide and subsequently after 20, 40, 60 and 80 minutes. The UV-Vis spectrum obtained after 5 minutes indicated absorption bands centered around 420 nm polaron bands and 750 nm bipolaron band. As time proceeded, the bipolaron band at 750 nm diminished while the 420 nm and 310–320 nm bands increased in intensity. The 750 nm band have been attributed to presence of pernigraniline (quinoid form) of polyaniline. The pernigraniline formed in the initial stages of the reaction was reduced to emeraldine salt by the addition of aniline to growing polymer chain. This change was also accompanied by an increase in absorbance in the region of 1000 nm. After 80 minutes, the solution turned completely green, and the absorption spectra indicated the presence of polyaniline in the emeraldine salt form, which provided further evidence for the presence of polyaniline in the oxidized state. The DNA, thus provides the counter-ion and acts as a dopant for the polyaniline.

D. Change in CD Spectra During Polymerization

The CD spectra of Calf thymus DNA at pH 4, shown in FIG. 10, compared well with the already reported spectra, of DNA polymorph 'B'. The spectrum did not change with the addition of aniline and horseradish peroxidase. Very significant changes in the CD spectra were noticed after 5 minutes, subsequent to the addition of hydrogen peroxide. The 220 nm positive peak increased in intensity, while the 245 nm negative peak reduced in intensity. The positive ($\Delta\epsilon$) shoulder at 270 nm changes to a new negative peak with fine structure. The positive peak at 275 nm reduced in intensity significantly. The CD spectra in the visible region showed the appearance of broad bands centered at 367 nm and 444 nm.

The CD spectra were measured until 80 minutes after the addition of hydrogen peroxide. A comparison of the spectra of DNA-polyaniline obtained at 5 minutes and 80 minutes indicated very little changes in the 200–320 nm region. It was concluded that changes in the secondary structure of DNA occurred earlier than 5 minutes after the addition of hydrogen peroxide. However, the positive, broad bands centered around 367 nm and 444 nm increased in intensity steadily over time.

At pH4, the polyaniline to remain charged and the phosphate groups in DNA provided the counterion for maintaining charge neutrality. The shielding of phosphate groups by polyaniline induced a change in the secondary structure of DNA leading to the formation of the over-wound polymorph. On comparison with the earlier reports pertaining to change in secondary structure of Calf thymus DNA induced by the nature of solvent and concentration of salt (see Sprecher, et al., *Biopolymers* (1979), volume 18: page 1009; Bokma, et al., *Biopolymers* (1987), volume 26: page 893), it was concluded that the formation of polyaniline caused a change similar to a 'B' to 'C' polymorphic transition. As a control, a DNA solution of same concentration was treated with 6 molar ammonium fluoride. The shape of UV region of CD spectra of the DNA solution containing 6 molar ammonium fluoride resembled that of DNA-polyaniline (FIG. 11). However, in the case of DNA-polyaniline, the concentration of aniline used in the reaction was limited to a few millimoles. Yet the changes in the CD spectrum were significant. This confirmed the formation of a polyelectrolyte complex of DNA-polyaniline.

The visible region of the CD spectrum provided interesting information on the secondary structure of the polyaniline. The increase of the 367 nm and 444 nm CD bands until 80 minutes indicated the development of chirality in the polyaniline concomitant with the increase of molecular weight. Chirality/optically activity has been observed in chemically (Majidi, M. R., et al., *Polymer* (1995), volume 36: page 3597 and electrochemically (Majidi, M. R., et al., *Polymer* (1994), volume 35: page 3113) synthesized complex and colloids (Barisci, J. N., et al., *Synth. Met.* (1997), volume 84: page 181) of polyaniline and (IR)-(−) 10-Camphorsulfonic acid. The observed macroasymmetry of the polyaniline salts formed in the presence of (+) or (−)-camphorsulfonic acid has been rationalized in terms of the polyaniline chain adopting a preferred one-sense helical screw maintained by the dopant anions via electrostatic and H-bonding. It is therefore probable that the electrostatic interactions between the DNA double helix and polyaniline, induced a macroasymmetry in the polyaniline.

The enzyme catalyzed synthesis described here, can be extended to the polymerization of functional monomers (substituted phenols/anilines) with interesting optical and electrical properties. This method can also be extended to other ionic biological polyelectrolytes such as collagen. Chiral organization of polyaniline around DNA may enhancement in the electrical conductivity of polyaniline. In addition, the chirality and electrical properties of polyaniline combined with the selectivity of DNA may be useful in the design of highly specific biosensors.

Example 4

A. Changes in CD Spectra During Oxidation or Reduction of Polyaniline

The secondary structure of DNA was readily controlled by the changing the extent of oxidation of polyaniline. The pH of the DNA-polyaniline solution was changed from 4–10 by adding 1 M NaOH and the CD spectra was obtained (FIG. 12A). It was evident that the CD spectra of DNA changed rapidly, and at pH 6, the DNA reverted back to its loosely wound state ('B' form). The neutralization of polyaniline minimized the electrostatic interaction between the DNA and polyaniline resulting in the uncoiling of DNA, back to its native state.

Evidence that the observed conformational changes were due to reduction of the polyaniline was obtained from the UV-Vis spectra (FIG. 13A). A decrease and subsequent disappearance of the polaron bands at 404 and 755 nm as the pH of the solution increased was observed. Simultaneously, the exciton transition of the quinoid rings at 564 nm and the $\pi$–$\pi^*$ transition of the benzenoid rings at 320 nM emerged. The solution went through a series of color changes, from green to blue to purple indicating the transition of the polyaniline to the emeraldine base form. Two isobestic points at 354 nm and 458 nm were observed. The changes observed in the UV-Vis and the CD spectra under increasingly basic conditions were consistent with partial unwinding of the DNA duplex as consequence of the reduction of polyaniline.

When DNA-polyaniline was reoxidized using HCl, it was observed that the CD spectrum approaches the original CD spectra of oxidized DNA-polyaniline at pH 4 (FIG. 12B). The evidence for reoxidation of polyaniline was observed in the UV-Vis spectra (FIG. 13B) as indicated by the recovery of polaron bands and the decrease of the exciton transition band. The average recovery of the CD bands at 290 nm, 285 nm, 275 nm and 245 nm was greater than 50%. The same solution was reduced and reoxidized (taken to pH 10 and back to pH 4). CD spectra obtained during this process indicated a significantly better recovery (75%) in the DNA region. Therefore, it was possible to reversibly change the conformation of the DNA (over-wind and unwind) by controlling the degree of oxidation of polyaniline.

B. Control Experiments

Control experiments were performed by mixing a molecular complex of polystyrene sulfonic acid and polyaniline, with Calf thymus DNA. There was no observable change in the conformation of DNA. This experiment provides unambiguous evidence for existence of polyaniline, closely bound to the DNA, only if the synthesis of polyaniline is performed in the presence of DNA.

The present study has demonstrated the use of DNA as a substrate for the synthesis of polymers with unique electrical and optical properties. The conducting polymer (polyaniline) bound to the DNA can be used as a "tool" to manipulate the conformation of the DNA. In principle, the doping, dedoping and redoping process and the conformational switching can also be accomplished electrochemically. This can enhance the speed and ease of doping/dedoping process. The remarkable specificity in the recognition capabilities of DNA can be combined with the doping dependent electrical properties of polyaniline to develop methods for highly selective DNA detection and biosensing.

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition of matter, comprising a polynucleotide template and a substituted or unsubstituted polyaniline bound together as a complex, wherein the polyaniline is a macromolecule having a chiral structure and intrinsic electrical conductivity.

2. The composition of claim 1, wherein the polynucleotide is a single strand.

3. The composition of claim 1, wherein the polynucleotide is a double helix.

4. The composition of claim 1, wherein the polynucleotide template is a deoxyribonucleotide.

5. The composition of claim 1, wherein the polynucleotide is a ribonucleotide.

* * * * *